Patented Apr. 27, 1948

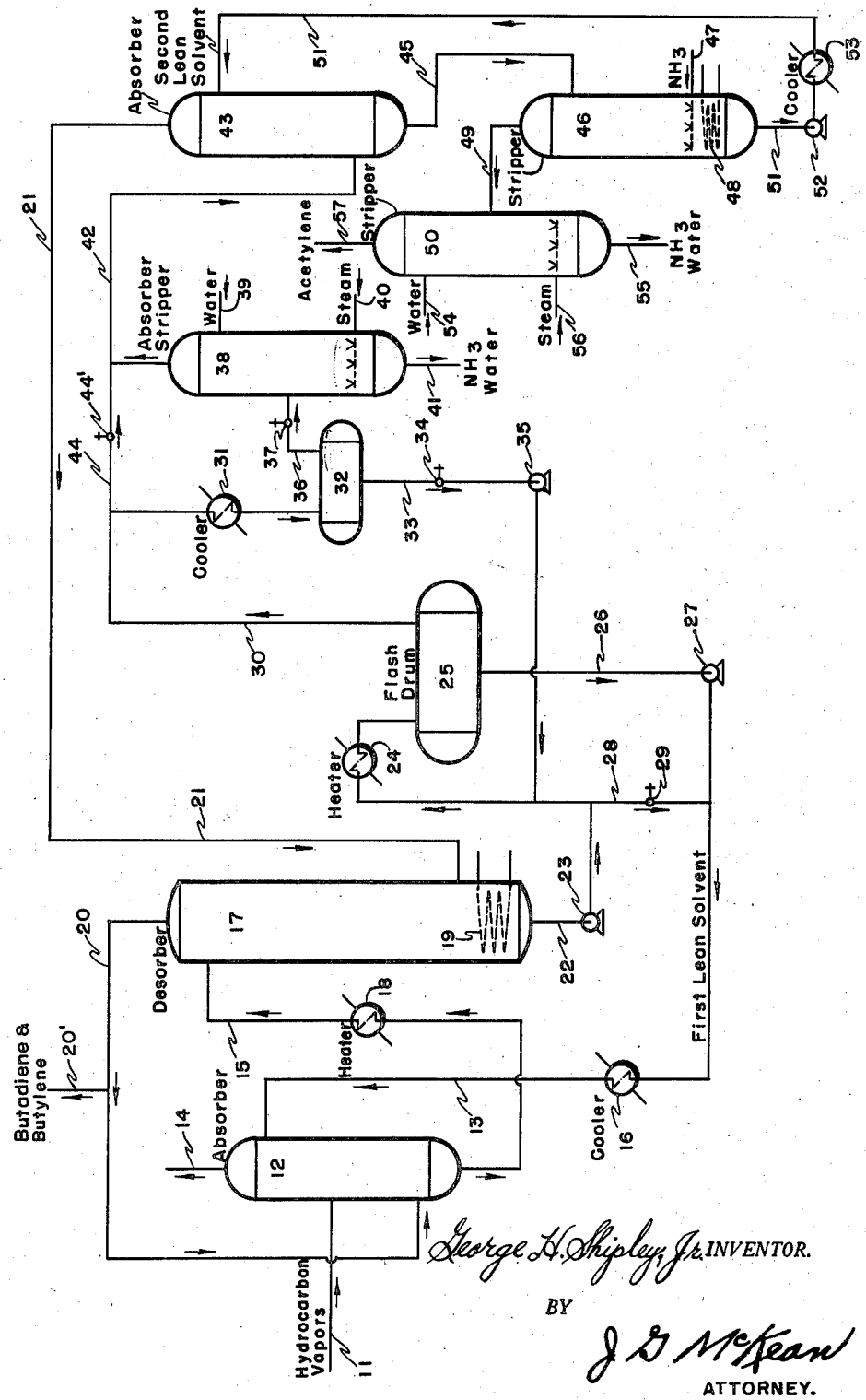

2,440,493

UNITED STATES PATENT OFFICE 2,440,493

PROCESS FOR SEPARATING BUTADIENE AND ACETYLENE FROM A HYDROCARBON MIXTURE

George H. Shipley, Jr., Baytown, Tex., assignor to Standard Oil Development Company, a corporation of Delaware Application March 27, 1944, Serial No. 528,190

6 Claims. (Cl. 260—679)

The present invention is directed to the removal of light hydrocarbons from a solvent. More specifically, the present invention is directed to the separate removal of hydrocarbons of differing solubilities, such as acetylene and butadiene, from an aqueous solution of a metallo-organic compound.

The use of a liquid to extract selectively a hydrocarbon from a hydrocarbon mixture is common to the art. The hydrocarbon mixture is contacted with the liquid under conditions to cause the liquid to take up appreciable amounts of the desired hydrocarbon, and the extract is then removed from the hydrocarbon mixture and subjected to conditions to cause the release or desorption of the desired hydrocarbon from the liquid. An example of such a procedure in commercial operation is the extraction of butadiene from a hydrocarbon mixture by aqueous solutions of cuprous ammonium acetate.

The gaseous stream from which it is desired to remove the butadiene usually includes other materials, such as butylene and small amounts of methyl, ethyl and vinyl acetylenes. The acetylenes are more strongly absorbed by the aqueous solvent employed than is the butadiene, and as a result the concentration of the acetylenes tends to build up with time in the selective solvent. The progressive increase of acetylene content in the solvent has several disadvantages. Part of the acetylenes tend to polymerize in the solvent, and the polymers foul the surfaces of heat exchange equipment with which they come in contact. The polymer causes the extracting liquid to foam and so interferes with the smooth operation of the process. In addition, there is danger that the desorption of the solvent after the acetylene content therein has built up to a substantial concentration will cause the removal of such an amount of acetylene that the acetylene content of the desorbed butadiene may exceed a predetermined minimum, for example 1,000 parts per 1,000,000.

It is an object of the present invention to provide a process for absorbing two hydrocarbons of differing solubilities in an aqueous solvent and to separately recover the hydrocarbons from the solvent. More specifically, it is an object of the present invention to provide a process wherein a solvent is contacted with a hydrocarbon mixture and more strongly absorbs an undesirable hydrocarbon than a desirable hydrocarbon, and in which the concentration of the undesirable hydrocarbon in the solvent is prevented from building up.

The process of the present invention may be described broadly as involving two different stages. As the first stage a hydrocarbon mixture in a first absorption zone is brought into contact with an aqueous solvent which is capable of absorbing one component of the hydrocarbon mixture more strongly than a second component, while the conditions are maintained to cause the absorption of both components, and the rich solvent is then removed to a desorbing zone, where it is subjected to conditions to cause the removal of both of the hydrocarbon components as well as a portion of water vapor from the aqueous solution. In the second stage the hydrocarbon mixture and water vapors flashed from the lean solvent from the first stage are brought into contact with a second solvent while the conditions of contact are maintained to cause the release as a vapor of the major portion of the more desirable hydrocarbon component and the absorption of the less desirable hydrocarbon component, and the second solvent is then subjected to conditions to release the absorbed hydrocarbons.

When applying the process of the present invention to the separation of butadiene from a hydrocarbon mixture, the aqueous material commonly used for the recovery of butadiene is cuprous ammonium acetate, and this material absorbs undesirable acetylenes from the hydrocarbon mixture along with the butadiene. As the first step of the second stage in the process, the lean solvent is subjected to conditions to flash off in a vaporous condition butadiene, water vapor, ammonia and acetylenes. As a second step, the vaporous admixture is subjected to a solvent different from that of the first stage to absorb selectively acetylenes from the vaporous admixture and to allow butadiene vapors to be released. The acetylenes may then be desorbed from the second solvent. It has been found desirable to employ a concentrated solution of cuprous ammonium acetate at temperatures of the order of 40° F. in the first absorption stage and to employ a more dilute solution of cuprous ammonium acetate at a temperature of the order of 170° to 190° F. in the second absorption stage. When employing these specific solvents at the temperatures named, relatively small amounts of solvent are required for circulation in the second stage, and the materials discarded from the second stage are of the order of 90% concentration of acetylenes.

A preferred embodiment of the present invention will now be described in conjunction with the drawing, in which the sole figure is in the form of a diagrammatic flow sheet.

Referring now specifically to the drawing, a mixture of hydrocarbon vapors including butadiene, butylene and small amounts of methyl, ethyl and vinyl acetylenes is fed via line 11 into absorption tower 12, where it is contacted with cuprous ammonium acetate solution conducted to the tower through line 13 and flowing downwardly through the tower countercurrent to the upwardly rising stream of gases. Unabsorbed gases are removed from the top of the tower through line 14 and rich solvent is removed from the bottom of the tower through line 15. It is desirable to maintain the temperature of the absorption liquid approximately 40° F., and this may conveniently be done by means of cooler 16 arranged in inlet line 13.

The rich solvent in line 15 is passed into the top of tower 17, which serves as a desorber and also as an extraction tower. If desired, line 21 may connect into line 11, provided the vapors in line 21 are cooled. A vaporous mixture comprising butadiene and acetylenes is injected into the lower portion of the tower through line 21. It is preferred that the temperature of the fluids within tower 17 be approximately 160° F., and in order to obtain such temperatures the rich absorption oil may be passed through a heater 18 in line 15 before it is injected into tower 17, and in addition a heating coil 19 may be arranged within the tower. Vapors comprising almost entirely butadiene and butylene are removed from the upper end of the tower through line 20 and outlet 20'. A portion of the vapors removed from tower 17 is recycled to tower 12 by way of line 20 to allow the obtaining of a butadiene fraction of required purity. A gaseous mixture comprising butadiene and a minor portion of acetylenes is injected into the lower portion of the tower through line 21 and passes upwardly through the tower countercurrent to the aqueous solvent. The countercurrent contact of the vapors and the solvent tends to absorb acetylenes from the vaporous mixture. Solvent is removed from the bottom of tower 17 through line 22 and passes through pump 23 and heater 24 into flash drum 25. It is preferred to remove butadiene and acetylene as vapors from drum 25, and the liquid remaining within the drum is then lean solvent and may be removed from the lower portion of the drum through line 26 and recycled through pump 27 and line 13 for use in absorption tower 12. If desired, a portion of the solvent removed from the bottom of tower 17 may be admixed with the lean solvent, and for this purpose by-pass line 28 controlled by valve 29 allows the removal of a portion of the solvent from line 22 and its admixture with the lean solvent in line 13.

The vaporous mixture of water, ammonia and hydrocarbons released in drum 25 are withdrawn through line 30 and pass through cooler 31 to accumulator 32. The cooling medium in unit 31 may conveniently be water, and causes the water vapors to condense and separate as a liquid phase in accumulator 32. The condensed water from the accumulator is withdrawn through line 33 controlled by valve 34 and passes through pump 35 to line 22 in order to maintain constant the concentration of the cuprous ammonium acetate solvent employed for absorbing butadiene from the hydrocarbon mixtures in tower 12.

Uncondensed vapors from accumulator 32 are withdrawn through line 36 controlled by valve 37 and passed into tower 38. Tower 38 is operated under conditions to remove the ammonia from the vaporous mixture, and to this end water is injected into the top of the tower through inlet 39 and allowed to flow downwardly countercurrent to the rising vapors. The water dissolves the ammonia from the vaporous mixture to form ammonia water. In order to prevent removal of hydrocarbons from the tower along with the ammonia water, stripping steam is injected into the bottom of the tower via inlet 40. Ammonia water is withdrawn from the bottom of the tower through outlet 41, and the uncondensed hydrocarbon vapors are withdrawn from the top of the tower through line 42. It will be seen that the vaporous mixture in line 42 differs from the vaporous mixture in line 30 in the greater concentration of hydrocarbons present therein. It is a distinct advantage to scrub the ammonia and water vapors from the vaporous mixture by the use of units 31, 32 and 38, but under some conditions it may be desirable to by-pass these steps and to send the vapors from line 30 through by-pass line 44 controlled by valve 44' directly to line 42.

The vaporous mixture is conducted through line 42 to the lower portion of absorption tower 43, where it passes upwardly through the tower countercurrent to a liquid solvent injected into the upper end of the tower through line 51. The solvent injected in tower 43 is different from that used in towers 12 and 17 in having substantially less affinity for the butadiene, and the major portion of the butadiene injected into tower 43 by means of line 42 is released and passes from the top of tower 43 through line 21 and is recycled to tower 17. The rich absorbent liquid containing absorbed acetylenes is withdrawn from the bottom of tower 43 through line 45 and into stripping tower 46. The rich absorbent flows downwardly in tower 46 countercurrent to gaseous ammonia injected into the tower through inlet 47. A heating means, such as steam coil 48, is arranged in the bottom of tower 46. The use of heating means and the stripping ammonia vapors releases the acetylenes and any remaining heavier hydrocarbons from the rich absorbent liquid, and these materials in vaporous form are removed from the top of the tower by means of line 49 and passed into a second stripping tower 50. Lean absorbent is withdrawn from the bottom of tower 46 through line 51 and forced by pump 52 through cooler 53 and recycled to the top of tower 43.

The vaporous mixture injected into tower 50 consists principally of acetylenes and ammonia. The ammonia is removed from the mixture by contacting it with downwardly flowing water injected into the top of tower 50 through inlet 54. The water flowing downwardly in the tower countercurrently to the rising vapor absorbs ammonia from the vaporous mixture and the resulting ammonia water is withdrawn from the bottom of the tower through outlet 55. Hydrocarbons absorbed by the water are stripped therefrom by the injection of stripping steam injected into the tower through inlet 56. Hydrocarbons consisting essentially of acetylenes are removed from the top of the tower through outlet 57. This hydrocarbon mixture may include a minor amount of butadiene, but the amount is small in comparison to the total amount of butadiene absorbed in the system, and the admixture withdrawn through line 57 may be disposed of by burning or other suitable means.

Preferred conditions when operating the unit shown in the drawing include a temperature of 40° F. in absorption tower 12 and a temperature of 160° F. in the butadiene desorption tower 17. In order to remove substantially all of the acetylenes from the solvent employed in units 12 and 17, it is desirable for the flash drum 25 to be operated in the range of 180° to 190° F. at a pressure ranging from 6 to 20 pounds per square inch. The solvent conveniently used in the cycle including units 12, 17 and 25 may be cuprous ammonium acetate at a concentration of 3 mols per liter cuprous copper content. It is convenient to employ a cuprous ammonium acetate solution of lower concentration for the cycle including units 43 and 46. For example, a cuprous ammonium acetate solution of a concentration of 2 mols per liter cuprous copper content may be employed with the temperature of unit 43 maintained in the range of 170° to 190° F. and at a pressure ranging from 6 to 15 pounds per square inch. Unit 46, serving as an acetylene stripper, may be operated with a temperature of 170° to 190° F. at a pressure ranging from 6 to 15 pounds per square inch, and stripper vessel 50 may be operated with a top temperature ranging from 90° to 110° F. and a bottom temperature ranging from 140° to 170° F. at a pressure ranging from 6 to 15 pounds per square inch. If unit 38 is included in the cycle, it is convenient to operate it with a top temperature ranging from 90° to 100° F. and a bottom temperature ranging from 140° to 170° F. at a pressure ranging from 6 to 20 pounds per square inch.

It is to be understood that although aqueous cuprous ammonia acetate has been named as the aqueous solvent in the above example, the invention is not limited to the use of this material. Other aqueous solvents suitable for carrying out the present invention are water, ammoniacal water, aqueous solutions of silver nitrate, aqueous solutions of mercuric cyanide and aqueous solutions of cuprous chloride. The solvent may be broadly described as being an aqueous solution of any compound which will combine with acetylenes preferentially to butadiene and which will release acetylenes on suitable treatment, allowing the solvent to be regenerated. The feature of using a more absorbent solvent in the first than in the second stage may be maintained by using the same complex or solution under different concentrations and physical conditions in both stages, or if desired one complex or solution may be used in one stage and another complex or solution in the other stage.

It will be seen that I have disclosed a process for separating a first less strongly absorbed hydrocarbon from a second more strongly absorbed hydrocarbon in an absorption system utilizing two absorbent liquids. An absorbent liquid having relatively strong absorption action is used in an initial stage, and from this absorbent a major portion of the first hydrocarbon component is recovered. The remaining absorbent is then sent to a flashing zone in which the remaining hydrocarbons are flashed from the absorbent liquid, which is then recycled for further use. The flashed vapors are contacted with a second liquid absorbent under conditions to cause absorption of a minor portion of the first hydrocarbon and substantially all of the second hydrocarbon. From the second stage the first hydrocarbon is removed as a vapor and recycled to the first stage, and the second rich absorbent liquid from the second stage is sent to a recovery zone for the removal of the second hydrocarbon therefrom, and the resulting second lean solvent is recycled.

Having fully described the present invention, what I desire to claim is:

1. A process for separating butadiene and acetylene from a hydrocarbon admixture including butadiene and acetylene comprising the steps of contacting the hydrocarbon mixture in a first absorption zone with a first aqueous solution of ammonia cuprous acetate to absorb butadiene and acetylene from the hydrocarbon mixture and obtain a first rich solvent, subjecting the first rich solvent to preliminary desorption to remove a major portion of butadiene therefrom, subsequently stripping the resulting solvent to remove substantially all of the hydrocarbons therefrom in vaporous condition, contacting the vaporous hydrocarbons with a second solution of ammonia cuprous acetate in a second absorption zone to absorb a major portion of acetylene and a minor portion of butadiene from the vapors, removing unabsorbed vapors from the second absorption zone and removing rich absorbent from the second absorption zone and recovering hydrocarbons therefrom.

2. A process in accordance with claim 1 in which the first solution of ammonia cuprous acetate has a concentration of approximately 3 mols per liter and the second solution of ammonia cuprous acetate has a concentration of approximately 2 mols per liter.

3. A process in accordance with claim 1 in which the temperature in the first absorption zone is maintained at approximately 40° F., and the concentration of the ammonia cuprous acetate therein is approximately 3 mols per liter, and in which the temperature in the second absorption zone is maintained at approximately 185° F. and the concentration of the ammonia cuprous acetate in the second absorption zone is approximately 2 mols per liter.

4. A process for separating butadienes and acetylenes from a hydrocarbon mixture including butadiene and acetylene comprising the steps of contacting the hydrocarbon mixture in a first absorption zone with an aqueous solution of ammonia cuprous acetate having a concentration of approximately 3 mols per liter and maintained at a temperature of approximately 40° F. to absorb butadiene and acetylenes from the hydrocarbon mixture and to form a first rich solvent, heating the rich solvent to a temperature of approximately 160° F. in a preliminary desorption zone to remove a major portion of the butadiene therefrom, removing the resulting solvent from the preliminary stripping zone, heating it to a temperature of approximately 188° F. and reducing the pressure thereof in a flash zone to separate butadiene, acetylene, ammonia and water therefrom in vaporous form and obtain a lean first solvent, subjecting the resulting vapors to conditions to cause the condensation of water vapor, removing the condensed water, subjecting the resulting vapors to countercurrent contact with fresh water in a second absorption zone to remove ammonia vapor therefrom, passing the remaining vapors into a third absorption zone and contacting them with a second solution of ammonia cuprous acetate at a temperature of approximately 185° F. and a concentration of approximately 2 mols per liter to remove a major portion of acetylene and a minor portion of butadiene from the vapors, removing the remaining vapors from said third absorption zone, removing second rich solvent from the third absorption zone and passing it to a stripping zone to remove hydrocarbons therefrom and obtain a second lean solvent.

5. A process in accordance with claim 4 in which the lean first solvent from the flash zone is recycled to the first absorption zone and in which the second lean solvent from the stripping zone is recycled to the third absorption zone.

6. A process for separating butadiene and acetylene from a hydrocarbon mixture including butadiene and acetylenes comprising the steps of maintaining in a first absorption zone a first lean aqueous solution of ammonia cuprous acetate which absorbs acetylenes preferentially to butadiene and maintaining in a second absorption zone a second lean aqueous solution of ammonia cuprous acetate which absorbs acetylenes preferentially to butadiene and is a less concentrated solution and is less absorbent than said first lean aqueous solvent in the first absorption zone, contacting the hydrocarbon mixture in the the first absorption zone with said first lean aqueous solvent to absorb butadiene and acetylenes therefrom and obtain a first rich solvent, preliminarily desorbing the first rich solvent to remove a major portion of the butadiene therefrom, subsequently stripping the resultant first solvent to remove substantially all of the remaining hydrocarbons therefrom as vapors, contacting the hydrocarbon vapors in a second absorbent zone with second lean aqueous solvent to absorb the major portion of acetylene and a minor portion of the butadiene from the vapors, removing the unabsorbed vapors from the second absorption zone, withdrawing rich solvent from the second absorption zone and removing absorbed hydrocarbons therefrom.

GEORGE H. SHIPLEY, Jr.

REFERENCES CITED

The following references are of record in the file of this patent:

UNITED STATES PATENTS

| Number | Name | Date |
|---|---|---|
| 2,144,692 | Schuftan | Jan. 24, 1939 |
| 2,215,915 | Cope et al. | Sept. 24, 1940 |
| 2,248,873 | Lyman | June 3, 1941 |
| 2,325,379 | Durrum | July 27, 1943 |

FOREIGN PATENTS

| Number | Country | Date |
|---|---|---|
| 303,323 | Great Britain | Jan. 3, 1929 |
| 547,730 | Great Britain | Sept. 9, 1942 |
| 976 | Great Britain | Sept. 18, 1913 |
| 268,102 | Germany | Dec. 8, 1913 |